United States Patent
Schnatterly

[11] 3,840,288
[45] Oct. 8, 1974

[54] ELECTROCHROMIC DISPLAY HAVING ELECTRO-CATALYST

[75] Inventor: Stephen Eugene Schnatterly, Princeton, N.J.

[73] Assignee: Optel Corporation, Princeton, N.J.

[22] Filed: July 30, 1973

[21] Appl. No.: 384,058

[52] U.S. Cl. ............................................ 350/160 R
[51] Int. Cl. ............................................ G02f 1/36
[58] Field of Search ............................... 350/160 R

[56] References Cited
UNITED STATES PATENTS
3,521,941 7/1970 Deb et al. ................. 350/160 R
3,708,220 1/1973 Meyers et al. .............. 350/160 R Primary Examiner—Vincent P. McGraw
Attorney, Agent, or Firm—Joel F. Spivak

[57] ABSTRACT

An electrochromic device comprises a layered structure including a transparent conductive electrode, an electrochromic layer thereon, an ion permeable insulator on said electrochromic layer, an electrocatalytic layer on said insulator, and a sponge material on said electrocatalytic layer said sponge material containing substances which are ionizable by the electrocatalytic layer, the ions formed thereby either themselves being diffusable through or acting to permit other ions to diffuse through said insulator layer and stabilizing or promoting coloration of said electrochromic layer.

14 Claims, 1 Drawing Figure

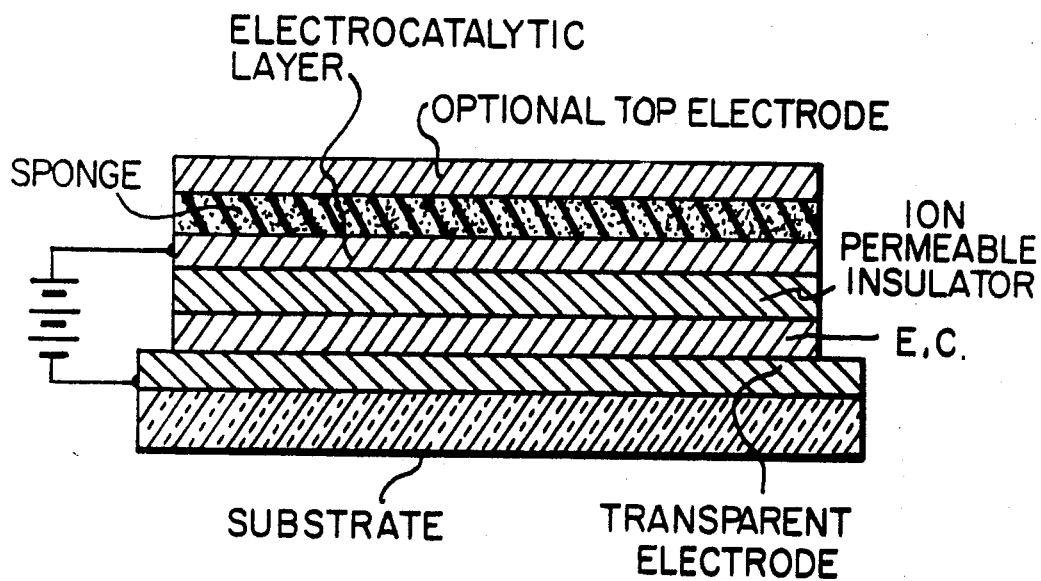

ELECTROCHROMIC DISPLAY HAVING ELECTRO-CATALYST

BACKGROUND OF INVENTION

This invention relates to electrooptical devices and more particularly to devices wherein the electromagnetic transmission characteristics may be reversibly altered by a suitably controlled electric field and commonly termed electrochromic devices.

The purpose of this invention is to provide an all solid state display which can be altered from a first absorption state to a second absorption state by the ionization of atoms or molecules in an electrocatalytic layer, which ions either diffuse into an electrochromic material thereby promoting a change in its color or neutralize space charges thereby allowing other ions to diffuse into the electrochromic to promote a color change. The novel devices are reversable in that the color can be bleached and the device returned to its initial state.

An electrochromic device, as defined herein, is a device which changes color upon the application of an appropriate electric field. Such a device incorporates an electrochromic material in which a color change is induced by the application of a field of one polarity and may be reversed by a field of the opposite polarity. Solid state electrochromic devices have been described previously. The most simple of these prior art devices consisted of an electrochromic material sandwiched between electrodes, at least one electrode being transparent. Prior to the application of an electric field, the electrochromic material is in a first or normal color state, if a suitable electric field is applied across the electrochromic material, it is caused to change its absorption characteristics and hence its color state. For example, the material may change from colorless to blue due to a field induced absorption of red light in the material. Similar changes can be observed in the invisible portion of the spectrum making theses materials suitable for the detection of normally invisible radiation such as infra-red radiation when combined with such material as photoconductors. These field induced color changes are generally long lasting after removal of the field. A field of opposite polarity tends to induce a reversal of color to the original color state. However, in this simple sandwich structure it was difficult to effect and control color reversal. The control and speed of the reverse process was improved by the inclusion of a second layer between the electrodes. Deb, et al. in U.S. Pat. No. 3,521,941 characterizes this second layer as a current carrier permeable insulator. The insulator employed by Deb et al. selectively introduces species suitable for the production of persistent coloration in the electrochromic material. While the device described by Deb et al. modulates transmitted light, the same device employing a reflective back electrode can be used as a reflective display modulating reflected light.

Briefly summarizing the above described prior art devices, there comprises either; an electrochromic material sandwiched directly between electrodes whose sole function is the creation of the electric field across the electrochromic material; or the combination of an electrochromic material adjacent a current carrier permeable insulator which combination is sandwiched between electrodes. The latter mentioned combination helps effect and control color reversibility. In another prior art device, described by M. D. Meyers in U.S. Pat. No. 3,708,220 an electrolyte gel is in contact with an electrochromic layer. This gel is the source of ions which promote coloration of the electrochromic layer.

The present invention, described in more detail hereinafter, while employing an insulator adjacent an electrochromic material, requires in addition to this combination an electrocatalyst and an atomic or molecular sponge which are not found in either Deb et al. or Meyers.

SUMMARY OF INVENTION

An electrochromic device comprises a layered structure including a transparent conductive electrode, an electrochromic layer thereon, an ion permeable insulator on said electrochromic layer, an electrocatalytic layer on said insulator, and a sponge material on said electrocatalytic layer, said sponge material containing substances which are ionizable by the electrocatalytic layer, the ions formed thereby either being diffusable through said insulator layer or neutralizing space charges and allowing other ions to diffuse through said insulator layer and stablizing or promoting coloration of said electrochromic layer.

A novel method of operating an electrochromic device includes the step of forming ions at an electrocatalyst and diffusing said ions into an electrochromic material whereby coloration of said electrochromic material results.

A novel method for bleaching the color of an electrochromic device which device comprises an electrochromic layer between a first electrode and an electrocatalytic layer and a sponge layer in contact with said electrocatalytic layer which contains substances which are ionizable at said electrocatalytic layer to form ions which promote coloration of said electrochromic materials includes the step of applying an electric field between said sponge layer and said first electrode in a polarity to cause previously diffused ions to diffuse back towards said electrocatalytic layer thereby bleaching said electrochromic layer.

BRIEF DESCRIPTION OF DRAWINGS

The sole drawing is an elevational cross-sectional view of an embodiment of the invention.

DETAILED DESCRIPTION OF THE INVENTION

A. Electrochromic Materials

As used herein, a "persistent electrochromic material" is defined as a material responsive to the application of an electric field of a given polarity to change from a first persistent state in which it is essentially nonabsorptive of electromagnetic radiation in a given wavelength region to a second presistent state in which it is absorptive of electromagnetic radiation in the given wavelength region, and once in said second state, responsible to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed after removal of the electric field, as distinguished from a substantially instantaneous reversion to the initial state as in the case of the Franz-Keldysh effect.

The materials which form the electrochromic materials of the device in general are electrical insulators or semiconductors. Thus are excluded those metals, metal alloys, and other metal-containing compounds which are relatively good electrical conductors.

Useful electro-chormic materials which generally exhibit electrochromism over a wide temperature range, e.g. −50°c to 125°c, have been disclosed in Deb et al. and include but are not limited to, for example tungsten oxide, molybdenum oxide, vanadium oxide, niobium oxide, tantalum oxide and uranium oxide.

In general, the useful materials for this invention are all the transition metal oxides which form bronzes. An "oxide bronze", $A_xMO_m$, is formally, a compound derived by the insertion of an element A into an oxide matrix $MO_m$ of a transition metal M. Reference can be made to an article entitled "The Tungsten Bronzes and Related Compounds" by P. G. Dickens and M. S. Whittingham in Quarterly Review, 22, 30 (1968) for further examples of definition of bronzes in an article by Dickens et al. in Journal of the Chemical Society of London Dalton Trans. page 30, 1973.

B. Electrodes

The first or front electrode of the device which is coated on a transparent substrate can be any transparent conductive electrode such as conductive tin oxide or conductive indium oxide, both of which are well known transparent electrode materials and are commercially available. Alternatively, a thin transparent metallic electrode can be employed e.g. a transparent gold electrode. The transparent electrode should not be reactive with nor dissolve in the electrochromic material.

The optional top electrode need not be transparent and it can be of any electrode material commonly employed as such.

C. Electrocatalytic Layer

The electrocatalytic layer may comprise, for example, palladium, platinum, rhodium or other catalytic material. Further examples of useful electrocatalytic materials can be found with reference to U.S. Pat. No. 3,077,507.

D. Sponge Materials

Suitable sponge materials include porous carbon porous Vycor, paper, cardboard, cloth or any ion exchange membrane such as polystyrene, sulfonic acid resins, Ionics 61, AZL 183 or other similar materials. The atoms or molecules which are absorbed in the sponge, and which upon ionization promote colorization of the electrochromics are preferably materials which upon ionization form hydrogen ions. Examples of such materials are hydrogen, the combination of water plus oxygen, water alone, and ammonia.

E. Insulator

The insulating layer may be of one or a combination of two general types. That is, the insulating layer may be comprised of (1) a material which does not itself contain ions therein which promote or stablize coloration of the electrochromic layer but which permits diffusion therethrough of which ions formed at the electrocatalyst or (2) an electron insulator which contains at least one cation which itself is capable of promoting or establishing coloration of the electrochromic material. This material may also possess the additional property of allowing the diffusion therethrough of cations formed at the electrocatalyst.

Insulating layers of the first type must be thin, for example less than about 1,000 A. and may be comprised of inorganic or organic insulators such as silicon oxide, magnesium fluoride, aluminum oxide, paraffin or other insulators as are described in Deb et al.

Insulating layers of the second type may be thin but are more typically thick insulators ranging from 1 micron to 50 mils. or more. Examples of insulators of this type, which may also operate in a combined mode, are, ion permeable hydrated ionic salts such as hydrated alkali metal salts or hydrated alkaline earth salts, ionic liquids such as sulfuric acid or any other material which is a source of ions which promote coloration of the electrochromic. Preferred salts are hydrated alkali halides such as $LiCl \cdot nH_2O$ may also be used. It is preferred that the insulator of this type be of a color, e.g. white, so as to provide a high contrast with at least one color state of the electrochromic layer. It is also preferred that this material be powdered, granular or polycrystalline so as to act as an opaque light scatterer and reflector. If the insulator were transparent the natural background would appear dark due to the typically dark nature of the electrocatalytic layer. This type of insulator differs from the insulator used in Deb et al. since when the latter insulator exceeds about 100 A. in thickness the Deb et al. device is essentially inoperative. Also, the speed of the novel device employing an insulator of the second type is relatively independent of insulator thickness. This is believed to be due to a mechanism wherein ionization at the electrocatalyst neutralizes space charges allowing ions in the insulator to diffuse into the electrochromic layer. In comparison, when employing an insulator of the first type the ions formed at the electrocatalyst diffuse through the insulator and into the electrocatalyst and hence response speed depends upon diffusion rate and insulator thickness.

F. Specific Embodiments

Referring to the FIGURE, there is shown from top to bottom a glass substrate, a transparent conductive coating such as tin oxide, a layer of an electrochromic material such as tungsten oxide, a layer of an ion permeable insulator, an electrocatalytic layer, and a layer of a sponge material. The insulator employed in the novel device described herein is an ion permeable insulator as opposed to one which allows the passage of electrons or holes under the influence of an electric field. The sponge material contains atoms or molecules therein which are ionized at the electrocatalytic layer during operation of the device. The ions formed at the electrocataltyic layer may pass through the insulator and into the electrochromic material under the influence of an electric field or may cause ions in the insulator to enter the electrochromic layer. That these ions promote coloration is meant to indicate that the color itself may be due to other phenomenon such as electron injection into the electrochromic material, however, the passage of the aforementioned ions is needed to promote or enhance or stabilize the color of the material. It should be noted that no field need be applied across the sponge layer to cause the molecules or atoms therein to flow toward the electrocatalytic layer. The flow of these atoms or molecules is caused simply by the concentration gradient which is present upon ionization of these atoms or molecules at the electrocatalyst. Bleaching of the coloration to bring the device back to its original color state is accomplished by applying the opposite polarity voltage between the electrocatalytic layer and the conductive electrode. Alternatively, bleaching can be accomplished by applying a voltage opposite in polarity to that causing coloration between an optional top electrode which may be placed over the sponge layer and the transparent electron.

It should be noted that either the sponge or the electrocatalytic layer must be an electrical conductor, since the two in combination serve as the back electrode for the device.

The electrochromic layer is typically a film of an electrochromic material in a thickness range of from 0.1 to 100 microns. Normally transparent thin films of 0.1 to 10 microns are preferred. In operation of the device using a tungsten oxide electrochromic layer, the device normally possesses the color of either the insulator or the back electrode to a viewer prior to the application of a proper electric field thereto. Upon application of the DC electric field of the polarity such that the atoms or molecules contained in the sponge layer become ionized at the electrocatalytic layer so that they can pass therethrough and cause or promote coloration of the electrochromic layer. Generally, the back electrode, which consists of the electrocatalytic layer and sponge layer is kept at a positive polarity while the transparent electrode is made negative. It is believed that there is a simultaneous passage of electrons into the electrochromic layer from the transparent electrode together with the passage of the ions from the insulating layer. When the aforementioned field is applied across the device, the active atoms or molecules in the sponge which are at the surface of the electrocatalytic layer are ionized and passed through the electrocatalytic layer into the insulating layer. This causes a concentration gradient in the sponge material thereby causing other atoms or ions to diffuse through the sponge material to the surface of the electrocatalytic layer where they are in turn ionized. During this process the electrochromic layer becomes colored and the device takes on the color of this layer. In order to bleach the electrochromic layer the polarity of the field is reversed such that the ions are drawn back into the electrocatalytic layer whereby they reform into their original atomic or molecular state and are reabsorbed by the sponge layer. Typically, fields in the order of several thousands volts per centimeter are required for operation of this device.

It should be understood that the electrodes can be patterned so as to form a display device depicting letters, numerals or any other desired pattern or picture. Likewise, the electrodes can be formed as an $x\,y$ matrix to provide a device capable of forming any desired variable pattern, coloration taking place only at the intersection of the rows and columns of the matrix. Switching systems for such devices are well-known in the art.

EXAMPLE 1

An electrochromic device comprises a glass support plate having a segmented transparent conductive tin oxide front electrode thereon. A 1 micron thick, transparent vacuum evaporated tungsten oxide electrochromic layer is formed over the support plate and front electrode, a 50A. thick $M_gF_2$ layer is formed over the tungsten oxide layer. A thin platinum black electrocatalytic layer having porous carbon thereon overlies the $M_gF_2$ layer.

EXAMPLE 2

The structure of this device is similar to the one described in Example 1 except that the tungsten oxide layer is about 0.5 microns thick and the insulator layer consists of compressed, powdered, partially hydrated LiCl in a thickness of about 10 mils. The LiCl layer forms a white background as seen through the glass support plate.

The back electrode may be formed from a carbon rod as used in a projection lamp by slicing the rod to a desired thickness, e.g. 1/16 inch thick, then sanding the rod to produce an even but not smooth surface. The sanded slice of carbon is heated over a bunsen burner and chloroplatinic acid is dripped onto the carbon surface and evaporated leaving a platinum black catalytic surface. This is but one way to form the back electrode which is then pressed onto the insulator layer of the device, other methods for forming the electrocatalytic layer and sponge may also be employed.

When selected segments of the tin oxide layer is made negative and the back electrode positive, a blue color is caused to appear in the tungsten oxide layer opposite the excited segments of the front electrode. This coloration may be erased by reversing the polarity of the device. The aforementioned device employing $LiCl \cdot n\,H_2O$ as the insulator colors to a suitable contrast ratio and bleaches to the original state in about one second.

What is claimed is:

1. An electrochromic device comprising a layered structure including a transparent conductive electrode, an electrochromic layer thereon, an ion permeable insulator on said electrochromic layer, an electrocatalytic layer on said insulator, and a sponge material on said electrocatalytic layer said sponge material containing substances which are ionizable at the electrocatalytic layer upon the application of an electric field to the device.

2. The device recited in claim 1 wherein said ionizable materials contained in said sponge are selected from the group consisting of hydrogen, water plus oxygen, water and ammonia.

3. The device recited in claim 1 wherein said sponge material is selected from the group consisting of porous carbon, porous glass, paper, cardboard, cloth, ion exchange membranes and ion exchange resins.

4. The device recited in claim 1 wherein the electrocatalytic layer is selected from the group consisting of palladium, platinum, and rhodium.

5. A method of operating an electrochromic device includes the steps of forming ions at an electrocatalyst and diffusing said ions into an insulating layer adjacent an electrochromic layer for promoting coloration of said electrochromic layer.

6. The device recited in claim 1 wherein said electrocatalytic layer is selected from the group consisting of palladium and platinum and wherein said sponge material is porous carbon.

7. An electrochromic device comprising a layered structure including a transparent conductive electrode, an electrochromic layer, a layer of an ion permeable insulator devoid of ions capable of forming a bronze with said electrochromic layer, said insulator layer having a thickness of not more than about 100 A., a back electrode comprising an electrocatalytic layer and a sponge layer said electrocatalyst being adjacent said insulator.

8. An electrochromic device comprising a layered structure including a transparent conductive electrode, an electrochromic layer, a layer of an ion permeable insulator having ions therein which form a bronze with said electrochromic layer, a back electrode comprising an electrocatalytic layer and a sponge layer said electrocatalytic layer being adjacent said insulator.

9. The device recited in claim 8 wherein said insulator layer is from 1 micron to 50 mils thick.

10. The device recited in claim 9 wherein said insulator is polycrystalline.

11. The device recited in claim 9 wherein said insulator is selected from the group consisting of hydrated alkali salts and hydrated alkaline earth salts.

12. The device recited in claim 9 wherein said insulator consists of a hydrated alkali halide.

13. The device recited in claim 9 wherein said insulator consists of hydrated lithium chloride.

14. The device recited in claim 9 wherein the electrocatalytic layer is platinum and said sponge is carbon.

* * * * *